United States Patent [19]

Coulmance

[11] Patent Number: 4,723,277
[45] Date of Patent: Feb. 2, 1988

[54] LOUDSPEAKING TELEPHONE SET HAVING AN ANTI-LARSEN DEVICE FOR INSTABILITY DETECTION AND CONTROL

[75] Inventor: Jean-Pierre Coulmance, Osny, France

[73] Assignee: U.S. Philips Corporation, New York, N.Y.

[21] Appl. No.: 903,049

[22] Filed: Sep. 2, 1986

[30] Foreign Application Priority Data

Sep. 3, 1985 [FR] France .................... 85 13062

[51] Int. Cl.$^4$ ............................ H04M 9/08
[52] U.S. Cl. .................................. 379/390
[58] Field of Search ............ 379/390, 388, 420

[56] References Cited

U.S. PATENT DOCUMENTS 4,484,034 11/1984 Ferrieu .................... 379/390

Primary Examiner—Stafford D. Schreyer
Attorney, Agent, or Firm—Thomas A. Briody; Jack Oisher; William J. Streeter

[57] ABSTRACT

A loudspeaking telephone set incorporating an anti-Larsen device which upon detecting instability controls the insertion of an attenuator in either or both of the listening and transmission channels. Such device incorporates a detection circuit (6) for detecting a start of instability, consisting of two analogue multiplier circuits (11), (15), two low-pass filters (18), (20), and two absolute-value convertors (19), (21), these elements being arranged in two parallel chains. One of the multiplier circuits (11) receives at its inputs the amplified signal from the receiver (4) and from the microphone (3). The other multiplier circuit (15) receives the same signals, except that one of them is phase-shifted approximately 90° at the Larsen frequency, by a phase-shift circuit (16). At the output of the absolute-value convertors (19), (21), the signals are added together by an adder (23) which delivers at its output an attenuation control signal after passing through a threshold comparator (24).

From among all the signals present in the telephone set, the detection circuit (6) performs effective selection of those which correspond to a start of instability.

10 Claims, 5 Drawing Figures

LOUDSPEAKING TELEPHONE SET HAVING AN ANTI-LARSEN DEVICE FOR INSTABILITY DETECTION AND CONTROL

BACKGROUND OF THE INVENTION

1. Field of the Invention

The present invention relates to a telephone set for amplified listening equipped with an anti-Larsen device, a circuit of the separation of the signals received or transmitted on a telephone line, a microphone, a power amplifier for the received signals whose output is connected to a loudspeaker for amplified listening. The said anti-Larsen device upon detecting the start of instability, via a delayed switch controls the insertion for a predetermined duration of at least one attenuator in the path of at least one of the listening or transmission channels.

2. Description of the Related Art

A telephone set of this type is known in particular from French Pat. No. FR-B-2 537 810. In the known telephone set the said circuit for the detection of a start of instability controls on an "all or nothing" basis the insertion in circuit of an attenuator located in the amplified-listening channel. This circuit, which detects the exceeding of a signal-level threshold in the transmission channel (the microphone signal), to control the insertion in circuit of the attenuator, comprises a high-pass filter or band-pass filter so taht it is more sensitive to signals whose frequency is close to that at which the Larsen effect can occur and less sensitive, in comparision to noises and lower frequencies.

According to the patent referred to, it is also proposed, by way of variation, that circuits be added permitting the frequency at which the Larsen effect occurs to be shifted upwards so that the start of instability observed by the user during the reaction delay of the detection circuit will be less unpleasant and also in such a way as to raise to a higher frequency the sensitivity of this device to noises around the microphone.

Although a device of this kind reduces the risk of untimely switching into circuit of the attenuator in response to a noise at the transmission end, that risk still remains. On the other hand, practical considerations lead to the preferential use, as a high-pass or band-pass filter, of filters which have low attenuation and which for that reason easily cause instability of the loop in which they are inserted. Furthermore, the shifting upwards of the frequency at which the Larsen effect occurs does not offer sufficient immunity. against the effect of noises in the vicinity of the microphone. This is because the harmonics of noise signals caused by the lack of linearity, which is practically unavoidable, of the filters and the amplifiers, also create a risk of unwanted switching of the attenuator into circuit. It would therefore be desirable for the anti-Larsen device to react only to the phenomenon of the Larsen effect and to remain totally insensitive to noises in the vicinity of the microphone.

Finally, in implementing the known anti-Larsen device, it is necessary to adopt a practical compromise taking into account the integration time constant of the rectified signal from the microphone with a view to its application to a threshold comparator. The immunity of the circuit against transitory noises increases the time constant in question is increased. However, on the contrary, the effect observed by the user during the corresponding delay is more disagreeable the longer it lasts.

The patent referred to relates to a telephone set in which the control of the attenuator is on an "all or nothing" basis. Another known practice is to use a set of attenuators operating in discrete values, for example of 6 dB, which are switched successively into circuit in series as long as the Larsen effect persists.

Another idea proposed in other implementations in the previous state of the art to employ proportional control of a variable attenuator, an arrangement in which the signal is derived either from the level of the listening signal or from the level of the transmission signal or from a combination of the levels of these signals. However, this technique make it necessary to deal with an extra problem caused by its mode of operation in order to prevent instability peculiar to the anti-Larsen device, and the means which have to be employed are complex and therefore expensive.

SUMMARY OF THE INVENTION

An object of the present invention is to overcome the aforesaid disadvantages while offering a simple, economical solution whose constituent elements, or at least the majority of them, are easily integrated in a monolithic circuit.

The invention is based on the recognition that an anti-Larsen device whose attenuation control signal is derived from a combination of the listening and transmission signals and which, in addition to the amplitude, is sensitive to the phase of these signals and to the equality of their frequency components, would in particular be insensitive to the noises in the vicinity of the microphone.

According to the present invention, a telephone set with amplified listening of the type defined in the preamble is characterized in that the anti-Larsen device instability detection circuit comprises:

a first analogue multiplier circuit one of whose inputs receives the signal applied to the listening loudspeaker while its other input receives the signal from the microphone after amplification of this signal by a high-gain amplifier, a second analogue multiplier circuit whose inputs are connected in parallel to the inputs of the first multiplier circuit, via, in the case of one of them, a phase-shift circuit, this phase-shift circuit introducing a phase change of 90° for a frequency near that at which the Larsen-effect occurs, an adder circuit with two inputs, a first low-pass filter whose input is connected to the output of the first multiplier circuit, whose output is connected to one of the inputs of the adder circuit via an absolute value converter, and a second low-pass filter whose input is connected to the output of the second multiplier circuit, and whose output is connected to the other input of the adder circuit via another absolute-value converter, a threshold comparator receiving the output signal from the adder circuit and delivering at its output a control signal for the said delayed switch.

The invention derives its advantage from the fact that the attenuation control signal is derived from the multiplication of the transmission and listening signals, a multiplication which only gives rise to a significant direct-current component in the presence of the Larsen effect. The double-frequency component produced by the multiplication of the signals is easily eliminated by a filter which requires only a low time constant, which gives the advantage that the intervention lag obtained by the anti-Larsen device suggested according to the invention is distinctly shorter than that of the previous state of the art and therefore less troublesome for the user.

The particular case in which the listening and transmission signals would be phase-shifted by 90°—in which case a direct component is not produced by the first multiplier circuit—is solved according to the invention by the presence of the complementary chain comprising the second multiplier circuit, the second low pass filter and its associated adder circuit, a chain which receives at one of its inputs a signal phase-shifted by approximately 90° at the frequency at which the Larsen effect occurs.

By a high-gain amplifier is understood an amplifier with a gain sufficient to ensure that, in the event of the Larsen effect, the amplified signal from the microphone is saturated at a peak voltage close to half the power-supply voltage to that amplifier (if the amplifier is fed a single voltage, in relation to earth), or else is saturated at a peak voltage close to one of the two power-supply voltages (in the case of a symmetrical double power supply).

It will be clear that it is possible to choose to place the attenuator either in the receiving channel and, in that case, preferably in the amplified-listening channel, so as not to interfere with the signal of the receiver in the handset, or in the transmission channel connected to the microphone.

It is also possible, if so desired, to use the control signal from the detection circuit for connecting into circuit two attenuators, one in the listening channel and the other in the transmission channel.

According to a first form of implementation of the invention, the telephone set is also characterized by the fact that the delay switch incorporates means for applying different delay times, and by the fact that it inserts in circuit, if necessary, the said attenuator for a first duration counting from the start of the phone call, whose value is of the order of a second, while subsequent insertion or insertions in circuit of the attenuator, when they occur, are applied during another duration which is greater than the first duration.

Since the conditions which are most favourable for the production of the Larsen effect are created at the moment when the handset is lifted while it is very close to the amplified-listening loudspeaker, this form of embodiment makes it possible for a fresh test to be effected rapidly for the start of the call, when the conditions then prevailing make the Larsen effect much less probable.

A second mode of embodiment of the invention is characterized by the fact that the attenuator has several discrete attenuation levels which are brought into service successively in increasing order in response to the control of the anti Larsen device, while the attenuation level obtained after the disappearance of the Larsen effect is subsequently maintained.

The advantage this gives is that operation is more progressive although obtained by discrete values and the degree of attenuation finally obtained is near the necessary level and not distinctly higher as has to be allowed for in the case of an attenuator with a single level. This mode of operation can, of course, be combined with the first to derive combined advantages from them.

A third form of implementation of the invention is characterized by the use of at least one attenuator in each of the transmission and listening channels and by the presence of switching devices for the insertion in circuit of these attenuators alternately in each of the said channels, and also the presence of a speech detection device for the control of the said switching devices.

This mode of implementation has the advantage that none of the conversing users is unpleasantly aware of the switching into circuit of the attenuators, which is done for each of them on the receiving channel which is not in use.

BRIEF DESCRIPTION OF THE DRAWING

The description which follows with reference to the attached drawings will make it clear how the invention can be implemented.

DESCRIPTION OF THE PREFERRED EMBODIMENTS

Figure 1:
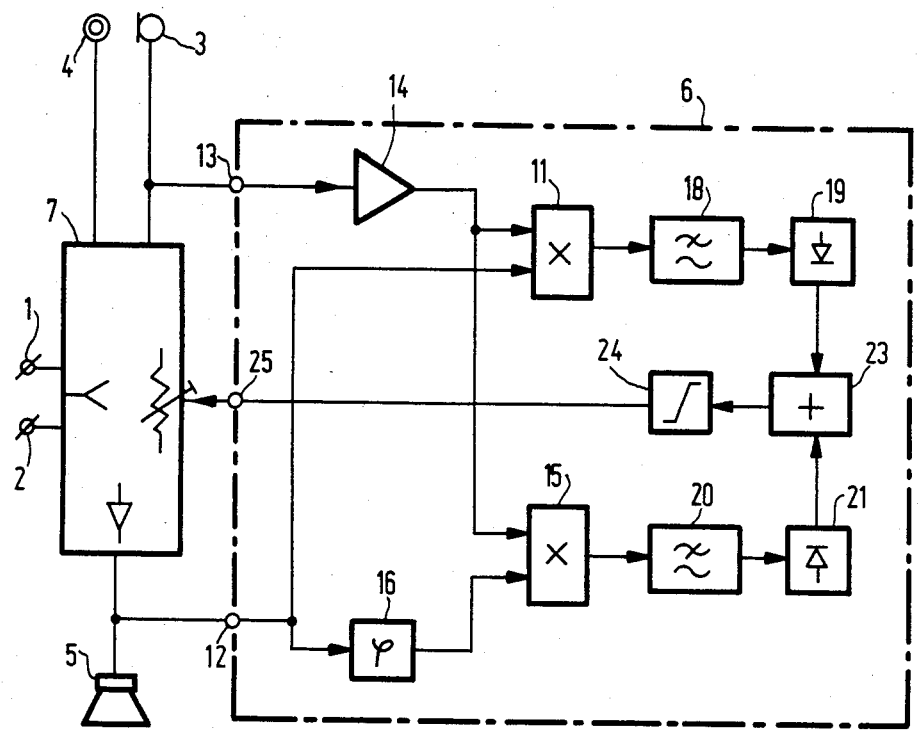
FIG. 1 shows, in the form of a schematic diagram, a telephone set according to the invention.

FIG. 1 shows the general diagram of a telephone set according to the invention. The wires from the line are connected to terminal 1 and 2 of the set. The set also comprises a microphone 3, a telephone receiver 4, a loudspeaker 5 for amplified listening, and also a circuit for the detection of the Larsen effect, the whole of whose functions are contained within the box drawn with dash-and-dot lines. For simplicity's sake, the other functions of the telephone set have been regrouped in FIG. 1 inside a block marked 7, which essentially comprises a circuit for the separation of the signals received from or transmitted to the telephone line, a power amplifier for the signals received, which is connected to the loudspeaker 5 for amplified listening, additional amplifiers, if any, for the signals transmitted to the receiver 4 on the one hand and received from the microphone 3 on the other, and also a delayed switch controlling one or more attenuators which, when inserted in circuit, effect the attenuation necessary for suppression of the Larsen effect.

Any start of instability is detected by the detection circuit 6 which controls at its output the said delayed switch. The assembly formed by the detection circuit 6, the delayed switch and the attenuator(s) constitutes what has been called an anti-Larsen device. The detection circuit 6 comprises a first analogue multiplier circuit 11 one of whose inputs receives the signal applied to the loudspeaker 5 via terminal 12, while the other input receives the signal from the microphone 3 connected to terminal 13 via a high-gain amplifier 14.

The detection circuit 6 also incorporates a second analogue multiplier circuit 15 whose inputs are connected in parallel to the inputs of the first multiplier circuit 11, on the one hand directly for one of them and on the other via a phase shift circuit 16 for the other input. The phase-shift circuit 16 introduces a phase shift of 90° for a frequency close to that at which the Larsen effect generally occurs. It is known in fact that, in a telephone set, the Larsen effect is most liable to occur at a frequency located between 2.5 and 3.5 KHz, this being due essentially to the response curve of the microphone and also that of the associated amplifier, which produces a maximum in that frequency range.

At least for a series of telephones sets constructed from similar elements, it is therefore known with relative accuracy at what frequency the Larsen effect will occur. It is consequently possible to design a phase-shift circuit 16 which ensures a phase shift of a value close enough to 90° at that frequency. Moreover, the precision of the phase shift is not critical for the operation of the detection circuit.

The first multiplier circuit 11 is connected by its output to input of a first low-pass filter 18, which delivers at its output a signal which is applied to an absolute-value converter 19, while the output of the second multiplier circuit 15 is connected to the input of the second low-pass filter 20, whose output signal is converted by another absolute-value converter 21. The output from the two absolute-value converters 19 and 21 is connected to the two inputs of an adder circuit 23 whose output is taken to a threshold comprator 24, which delivers at its output a control signal for the delayed switch from the output terminal 25 of the detection circuit 6.

The operation of the detection circuit 6 is based on the following observations. It will be noted first of all that when the Larsen effect occurs, the signal applied to the loudspeaker is saturated at a high value limited by the power-supply voltage of its amplifier On the other hand, the signal from the microphone, with the Larsen effect present, is also characterized by a high signal level whose value, however, may vary from, one telephone set to the other and depending on circumstances. Nevertheless, by means of a very high gain amplifier such as 14, the signal from the microphone can be made to saturate at a known value, practically constant, which depends solely on the power-supply voltage of the said amplifier. From the two signals, one from the loudspeaker 5 and the other from the microphone 3 and amplified by amplifier 14, there are obtained from their product, when these signals show a frequency with a fixed phase shift, on the one hand a single component at a frequency double that of the Larsen signal and, on the other, a direct-current component which may be positive, negative or zero, depending on the phase difference between the two signals which have been multiplied.

If the case of the positive or negative direct component is considered first, this may be rendered solely positive by means of an absolute-value signal converter 19, and the double-frequency component being eliminated by the low-pass filter 18. The case for which the result of the multiplication produces a direct-current component with the value zero occurs when the two signals applied to the input of the multiplier circuit 11 are phase-shifted 90° in relation to each other.

In the detection circuit 6 shown in FIG. 1, this last case is eliminated by the circuit branch comprising the phase-shifter 16, the second multiplier circuit, the low-pass filter 20 and the absolute-value converter 21. In fact, when the signals at the input of the first multiplier circuit 11 are phase-shifted 90°, the signal supplied to the second multiplier circuit 15 are then in phase or in phase opposition and, in that case, the result obtained at the output of the said multiplier circuit 15 incorporates a direct current component with a positive or negative value. If, for example, the two absolute-value converter circuits 19 and 21 produce a positive signal, their sum, obtained by means of the adder circuit 23, produces in all cases and for all possible phase-shift values, a positive direct-current signal. This signal is then applied to the threshold comparator 24, which delivers at its output a control signal transmitted to terminal 23 when the signal applied at its input exceeds a predetermined threshold which is characteristic of the presence of the Larsen effect.

One of the advantages of detection circuit 6 derives from the fact that when the Larsen effect occurs at least for a short period, the output signals from the multiplier circuits 11 and 14 each contain a D.C. component whose sign is fixed, so that, rapidly integrated by the low pass filters 18 and 20 and converted respectively by absolute value converters 19 and 20, they produce at the input of the threshold comparator 24 a D.C. signal of a high value in a particularly short time. On the other hand, in the case of noise whose frequency spectrum can be considered extensive with its amplitude distributed more or less uniformly in this spectrum, the acoustic coupling, which is mainly responsible for the Larsen effect, will introduce between the signals from microphone 3 and the loudspeaker 5 a phase difference which varies greatly over the width of this frequency spectrum. Thus, at the output of the multiplier circuits 11 and 15, the signals show in temporary form D.C. components whose sign and amplitude vary randomly. This means that, due to the effect of the low-pass filters 18 and 20, the mean of these signals is at a considerably lower level than that of the corresponding signals in the case of the Larsen effect. In other words the detection circuit 6 makes it possible to distinguish much more effectively the presence of Larsen effect in relation to ambient nose than the devices of the previous state of the art.

Another advantage of the invention is in the fact that, to separate the instability signal due to Larsen effect from the noise low-pass filters 18 and 20 can be used which have a higher cut-off frequency than those of the previous state of the art. This results in a shorter response time for the device. The task, in fact, is to separate two components, one of which is direct current and the other at a frequency double the originating frequent current and the other at a frequency double the originating frequency. The result thus is that the detection circuit 6 makes it possible to avoid more effectively any unwanted reaction to surrounding noise and that it offers the advantage of a faster response than the circuit of the previous state of the art. This delay in response is in fact not due to a compromise between the selectivity and the reaction time constant. This advantage is important because it makes it possible to suppress the Larsen effect in such a short time that it is scarcely perceptible by the user and therefore not at all troublesome in practice.

It may be pointed out, by way of example, that low-pass filters 18 and 20 can be chosen with a cut off frequency of 200 Hz, resulting in a reaction time for the detection circuit 6 of the order of only several milliseconds. The signals, at a frequency of the order of 3000 Hz, can still be attenuated by at least 20 dB by these same filters. It is also pointed out that 3000 Hz signals at the output of one of the multiplier circuits 11 and 15, correspond in reality to signals of half that frequency, i.e. 1500 Hz, applied to the inputs of these multiplier circuits. This value 1500 Hz is relatively near the frequency at which the speech signal generally possesses its maximum energy.

So far as the frequency at which the Larsen effect most frequently occurs, it should also be noted that the microphone has a preponderant influence since its response curve is fixed in a prescribed pattern which provides for considerable attenuation below 300 Hz and above 3400 Hz.

In addition to the explanations relating to the diagram in FIG. 1, it is useful to mention now a slight variation which has not been shown.

It is in fact possible, in one of the circuits connected to terminal 12 or to terminal 13, or in both these circuits simultaneously, to insert a high-pass filter so as to reduce still further the residual signal at the output of the adder circuit 23 in the presence of transmission/reception signals located in the frequency range lower than that in which the Larsen effect occurs. As this high-pass filter it is possible to use, for example, a single capacitor of a suitable value.

Figure 2:
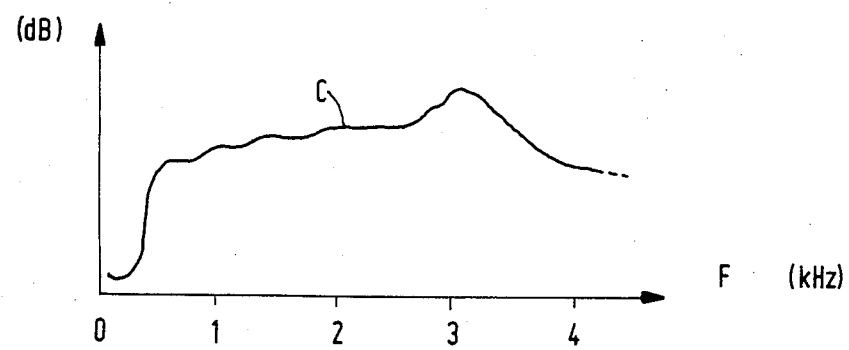
FIG. 2 shows typical example of the response curve of a microphone for a telephone set.

FIG. 2 shows a typical example of the response curve of a telephone microphone as a function of frequency. A response maximum will be noted in this figure in the vicinity of 3 kHz. With regard to the loudspeaker whose effect is combined with that of the microsphone its response curve usually shows bulges for the frequencies corresponding to resonances, one of which is situated at relatively low frequency and the others distributed at fairly high frequencies. The combination of these response curves determines a maximum which shows little frequency spread in standard equipment. That is why the phase-shift circuit 16 may easily be chosen so as to give a shift of more or less 90° for the frequency at which the Larsen effect occurs, and especially when a series of sets built from standard elements is concerned. If desired, it is also possible to have the phase-shift circuit adjustable so as to set it for a particular telephone set. It is pointed out elsewhere that when the Larsen effect occurs, the phase differences between the signals produced on the one hand by the microphone 3 and on the other by the loudspeaker 5, cannot be known in advance and depends on the particular circumstances of use (distance between the microphone and the loudspeaker, the resonance effect of the room, the proximity of reflecting objects, etc.). Depending on the value of the phase difference between the microphone and loudspeaker signals, it is easy to observe that the output signal from the adder circuit 23 can fluctuate by a factor $\sqrt{2}$.

These fluctuations do not constitute a major disadvantage, because the threshold comparator 24 can be easily adjusted to a level which is distant both from the level caused by noises (a level which remains low in this case) and from the—high—signal level produced in the presence of the Larsen effect. The additional fluctuations due to a phase rotation which is not quite 90° will not be more troublesome since they are weaker.

Figure 3:
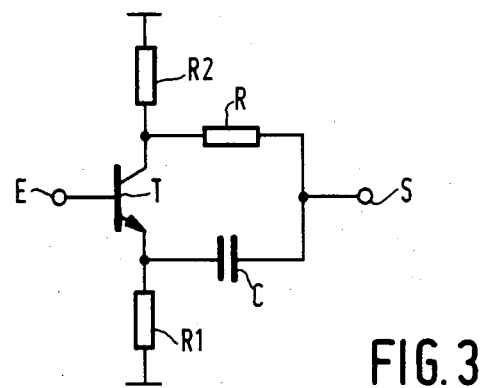
FIG. 3 shows, the diagram of a phase shift circuit which can be used in the telephone set according to the invention.

FIG. 3 shows, by way of example, the diagram of a phase-shift circuit which can be used as the phase-shift circuit 16 in FIG. 1. Of course, other known phase-shift circuits can also be used. The circuit in FIG. 3 shows an input terminal E connected to the base of a transistor T whose emitter is connected to a resistor R while its collector is connected to a resistor R2. The collector of transistor T is also connected to a resistor R whose other end is connected to the output terminal S, while the emitter of transistor T is connected to a capacitor C whose other end is also connected to the output terminal S. The resistors R1 and R2 are chosen with equal values. For simplicity's sake it will be assumed that the value of resistors R1 and R2 is small in relation to that of resistor R and that output S is connected to an impedance of a very high value in relation to R. This phase-shift circuit is known as such. It delivers at its output a signal phase-shifted by 90° in relation to the input signal applied to terminal E when the frequency of this signal and also the values of R and C satisfy the following relation:

$$2\ FC(R+R2)=1$$

It is easy to calculate that for a frequency variation of more or less 30% in relation to the reference frequency of this circuit (i.e. the frequency for which relation (1) is satisfied) a variation of the phase rotation which remains lower than ±20° has to be introduced. It will be clear that such a fluctuation has no appreciable consequence for the operation of the detection circuit 6.

Other forms of implementation of the invention will now be described with the aid of FIG. 4.

Figure 4:
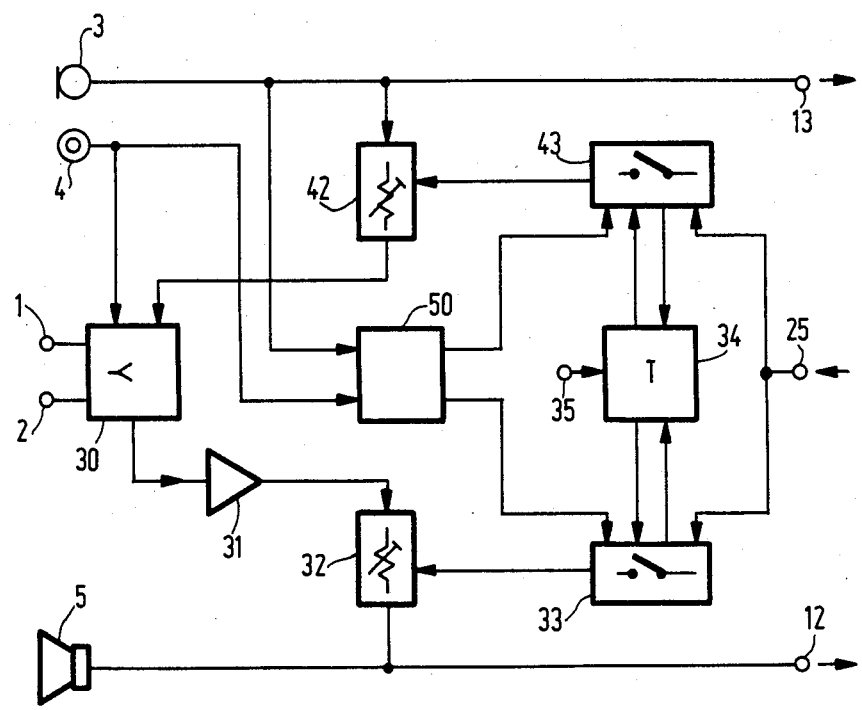
FIG. 4 is a schematic diagram showing additionally to FIG. 1, other forms of implementation of the invention.

In FIG. 4 the said block 7 containing the other functions in FIG. 1 has been shown in greater detail, while the detection circuit 6 in FIG. 1 has itself not been shown. The elements in FIG. 4 which correspond to those in FIG. 1 have the same numerical references. Terminals 1 and 2 to be connected to the line wires are connected to a transmission/reception separator circuit 30, a so-called "hybrid", which delivers the reception signal to a power amplifier 31. At the output of the amplifier 31, connected in series in the link to the loudspeaker 5, is a switch 33. If the attenuator 32 is not connected in circuit, it is then short-circuited. The switch 33 in turn is controlled from the terminal 25 receiving the control signal from detection circuit 6 (FIG. 1).

Switch 33 is operated under the control of a delay device 34 which keeps the attenuator 32 in circuit for one or more predetermined periods. In a simple form of implementation, given by way of example, the delay device 34 can be formed by a counter linked with a clock or the function can be performed by programming a microprocessor. As will be seen subsequently, the delay device 34 may in certain cases include a zero-reset control from a terminal 35, which receives a signal characterising the lifting of the handset and indicating the start of a call.

Of course, the attenuator 32 which was shown in FIG. 4 as being connected at the output of power amplifier 31 may also, in a form of implementation not shown, be inserted between the separator 30 and the power amplifier 31.

Instead of carrying out attenuation in the—amplified—listening channel or additionally to that attenuation, it is also possible to provide for attenuation in the transimission channel by means of an attenuator 42 inserted between the microphone 3 and the separator circuit 30. In that case, as has been shown in FIG. 4, attenuator 43 is in turn inserted in circuit by a switch 43 controlled from terminal 25 and also by the delay device 34.

In a preferred version of embodiment of the invention, the delay device 34 incorporates means for applying different lengths of delay, so that it inserts in circuit the attenuator(s) 32 and/or 42 for a first period coupling from the start of the call, the value of which is of the order of a second, while the insertion(s) in circuit of the attenuator(s) 32 and/or 42—in the event that they are used—are applied during another period of greater length than the first period. In that case a delay device zero resetting signal from terminal 35, as previously indicated, is used.

Either attenuator 32 or attenuator 42, or both of these attenuators, may to advantage have several discrete levels of attenuation which are inserted successively in circuit in increasing order in response to the control of the anti-Larsen device whereas the level of attenuation obtained after the disappearance of the Larsen effect is then maintained for a time delay the duration of which is much greater than a second. In that case, one or other of the attenuators 32, 42 may be formed by a train of resistors which are inserted successively by means of the associated switch 33, 43 which is then a multi-channel switch. The successive insertion of the attenuation resistors may be arranged, for example, for steps of 6 dB of attenuation.

It is of advantage in this form of embodiment to perform first, after a short delay, the successive insertions in circuit of the attenuation resistors until the Larsen effect disappears. After that, the time delay will, to advantage, maintain the situation reached for a period much in excess of a second and capable, for example, of extension during the rest of the call. Here, again, the delay device 34 is reset to zero via terminal 35 at the moment when the handset is lifted.

In another form of embodiment of the invention, which may be combined as desired with the preceding forms already described, arrangements are made for the use of at least one attenuator in both the transmission channel and the listening channel, with switching devices for inserting these attenuators in circuit alternately in each of the said channels, together with the use of a speech-detection device 50 for control of the said switching devices. The speech-detection device 50 is already known in the present state of the art, so that it is unnecessary to describe it here.

In the diagram of FIG. 4 the speech-detection device 50 receives two input signals, one from the microphone 3 and the other from the receiver 4. It delivers at its two output control signals which are applied to switches 33 and 43, respectively.

Thus, when a signal from microphone 3 shows, after detection, a value greater than the level of the signal from receiver 4, it is the amplified listening channel which is then attenuated by means of attenuator 32 and switch, 33 whereas, in the opposite case, it is attenuator 42 which is inserted in circuit by switch 43 while attenuator 32 is short-circuited. The insertion in circuit or removal from circuit of these attenuators depends on the signal present at terminal 25.

Figure 5:
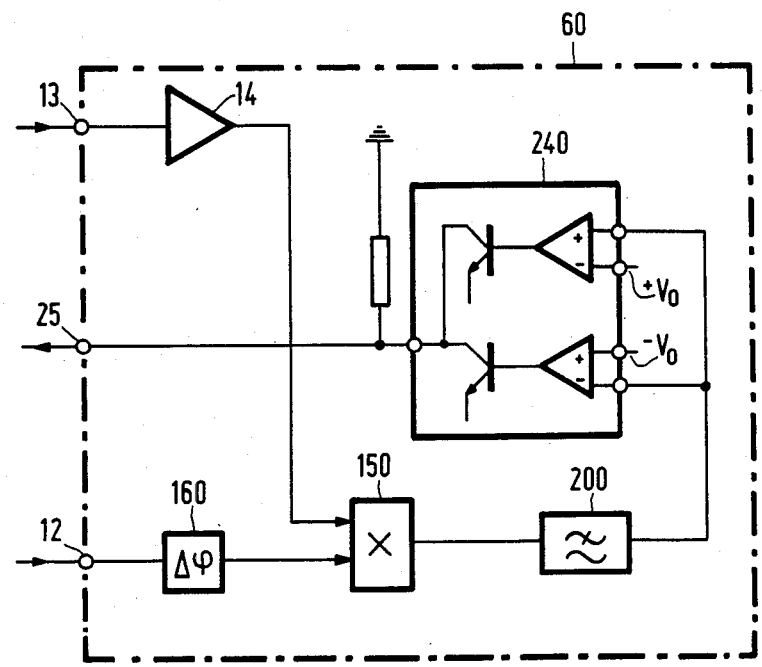
FIG. 5 shows a schematic diagram of a circuit for detection of the Larsen effect according to a variation on that described in connection with FIG. 1.

The description which now follows refers to FIG. 5, which shows a Larsen-effect detection circuit representing a variation on circuit 6 in FIG. 1.

The terminals 12, 13 and 25 for access to the Larseneeffect detection circuit 60 are connected to the other circuits in the telephone set in the same manner as in FIG. 1. It incorporates a single analogue multiplier circuit 150 one of whose inputs receives the signal applied to the loudspeaker via terminal 12, and the other input receives the signal from the microphone, via terminal 13, after amplification in a high gain amplifier 14.

In one or other of the inputs of the multiplier circuit 150, the corresponding signal—in the example the signal from the loudspeaker—may be applied via a phase-shift circuit for any necessary phase correction.

The output of the multiplier circuit 150 is connected to a low pass filter 200 delivering an output signal which is applied to the input of the trip circuit 240 with two symmetrical thresholds. Finally, the trip circuit 210 provides at its output a control signal which is transmitted to terminal 35 an intended to control the delayed switch (not shown) which introduces the appropriate signal attenuation.

The use of a trip circuit 240 which compares two signal inputs to two symmetrical voltage thresholds $+Vo$ and $-Vo$ is necessary here because the sign of the D.C. component at the output of the multiplier circuit 150 is not known.

This sign in fact depends on the anti-local signal which, because it results from a difference between two alternating-current signals, may be in phase with or in phase opposition to the microphone signal.

The detection circuit 60, although greatly simplified in relation to circuit 6 in FIG. 1, nevertheless operates on the same principle and can be substituted for it in the majority of cases without any observable degree of degradation in performance.

The simplification made in the structure of the detection circuit 60 is based on the following observation: the oscillation due to the Larsen effect occurs when the acoustic signals from the loudspeaker arrive at the microphone and produce there a signal such that the gain of the loop thus formed is greater than unity and the sun of the phase-shifts occurring in the loop is zero. In practice, when the distance between the loudspeaker and the microphone varies, either of two situations may occur: either the oscillation frequency varies slightly around the frequency of the maximum in the response curve of the chain: microphone-amplifiers-loudspeaker, so as to maintain the zero sum of phase shifts, or else the oscillation occurs for particular values of the acoustic distance if the response curve of the amplification chain shows a very pronounced amplitude maximum.

If it is assumed that the phase shifts with an electrical origin (particularly amplifiers) are always zero at the Larsen oscillation frequency, there is no need to use a phase-shift circuit in such as 160 to obtain at the output of the multiplier circuit 150 a direct-current component which is not zero.

In the majority of practical tests it is observed that phase-shifts with an electrical origin, although they can be different from zero, vary only slightly in the limited range of frequencies in which Larsen oscillation occurs.

It is then possible to use the Larsen-effect detection circuit in its simplified version shown in FIG. 5, in which the phase-shift circuit 160 has been adjusted, on the basis of experience, to a phase-shift value which compensated at least partially the sum of phase-shifts with an electrical origin and yields a significant (non-zero) signal for the D.C. component at the output of the multiplier circuit 150.

The sensitivity which the detection circuit 60 may, depending on circumstances, show to low phase fluctuations can be practically reduced to zero by a suitable choice of the threshold voltages $+Vo$ and $-Vo$ applied to the inputs of the trip circuit 240.

Needless to say, the additional forms of embodiment of the invention described with reference to FIG. 4 are also applicable in combination with the detection circuit 60 in FIG. 5.

Although the invention has been described here by means of examples of implementation, it will be understood that variations which can be readily thought of by the technical expert are possible and that these variations nevertheless remain within the scope of the invention. By way of example it has been pointed out that attenuators taking, in particular, the form of resistors inserted in either the listening channel or the transmission channel may be used. In using the term attenuator to describe a device of this kind it is intended, of course, also to designate as equivalent, variable-gain amplifiers one or more gain values of which can be controllable.

What is claimed is:

1. A telephone set for amplified listening equipped with an anti-Larsen device, a circuit for the separation of the signals received and transmitted on a telephone line, a microphone, and a power amplifier for received signals whose output is connected to a loudspeaker for amplified listening, the said anti-Larsen device being formed by a circuit for the detection of a start of instability which via a delayed switch, controls the insertion in circuit for a predetermined period of at least one attenuator is the path of at least one of the listening and transmission channels, wherein the instability-detection circuit comprises:

a first analogue multiplier circuit one of whose inputs receives the signal applied to the listening loudspeaker while the other input receives the signal from the microphone after implification of that signal by a high gain amplifier;

a second analogue multiplier circuit where inputs are connected in parallel to the inputs of the first multiplies circuit via, in the case of one of them, a phase shift circuit, this phase shift circuit introducing a phase-shift of 90° for a frequency close in that at which the Larsen-effect occurs:

a two-input adder circuit;

a first low-pass filter whose input is connected to the output of the first multiplier circuit and whose output is connected to one of the inputs of the adder circuit via an absolute valve converter, and a second low pass filter whose input is connected to the output of the second multiplier circuit and whose output is connected to the other input of the adder circuit via another absolute valve converter; and a threshold comparator receiving the output signal from the adder circuit and delivering at its output a control signal for the said delayed switch.

2. A telephone set with amplified listening, equipped with an anti-Larsen device, a circuit for the separtion of the signals received and transmitted on a telephone line, a microphone and a power amplifier for received signals, whose output is connected to a loudspeaker for amplified listening, the said anti-Larsen device consisting of a circuit for the detection of a start of instability which, via a delayed switch, controls the insertion in circuit for a predetermined period of at least one attenuator in the path of at least one of the listening and transmission channels, wherein the instability-detection circuit comprises:

an analogue multiplier circuit one of whose inputs receives the signal applied to the listening loudspeaker while the other input receives the signal from the microphone after amplification of this signal by a high-gain amplifier;

a low-pass filter whose output is connected to the input of the multiplier circuit; and a trip circuit with two symmetrical thresholds receiving at their input the output signal from the low pass filter and delivering at their output a control signal for the said delayed switch.

3. A telephone set for amplified listening as claimed in claim 2, wherein, at one of the two inputs of the analogue multiplier circuit, the corresponding signal is applied to it via a phase-shift circuit introducing a compensation phase-shift, determined experimentally, for a range of frequencies in which the Larsen-effect occurs.

4. A telephone set for amplified listening as claimed in claim 1, wherein the delayed switch incorporates means for applying different delay times, and wherein, if necessary, the said attenuator is inserted in circuit for a first period counting from the start of the telephone call, the value of said first period being of the order of one second, while any subsequent insertion of the attenuator into circuit, when it occurs, is applied for a longer period of time than the first period.

5. A telephone set for amplified listening as claimed in claim 1, wherein the attenuator has a plurality of discrete attenuation levels which are inserted in service successively in increasing order in response to a command from the anti-Larsen device and wherein the attenuation level obtained after the disappearance of the Larsen-effect is thereafter maintained.

6. A telephone set for amplified listening as claimed in claim 2, wherein the delayed switch incorporates means for applying different delay times, and wherein, if necessary, the said attenuator is inserted in circuit for a first period counting from the start of the telephone call, the value of said first period being of the order of one second, while any subsequent insertion of the attenuator into circuit, when it occurs, is applied for a longer period of time than the first period.

7. A telephone set for amplified listening as claimed in claim 3, wherein the delayed switch incorporates means for applying different delay times, and wherein, if necessary, the said attenuator is inserted in circuit for a first period counting from the start of the telephone call, the value of said first period being of the order of one second, while any subsequent insertion of the attenuator into circuit, when it occurs, is applied for a longer period of time than the first period.

8. A telephone set for amplified listening as claimed in claim 2, wherein the attenuator has a plurality of discrete attenuation levels which are inserted in service successively in increasing order in response to a command from the anti-Larsen device and wherein the attenuation level obtained after the disappearance of the Larsen-effect is thereafter maintained.

9. A telephone set for amplified listening as claimed in claim 3, wherein the attenuator has a plurality of discrete attenuation levels which are inserted in service successively in increasing order in response to a command from the anti-Larsen device and wherein the attenuation level obtained after the disappearance of the Larsen-effect is thereafter maintained.

10. A telephone set for amplified listening as claimed in claim 4, wherein the attenuator has a plurality of discrete attenuation levels which are inserted in service successively in increasing order in response to a command from the anti-Larsen device and wherein the attenuation level obtained after the disappearance of the Larsen-effect is thereafter maintained.

* * * * *